United States Patent [19]
VanderKelen et al.

[11] Patent Number: 5,167,367
[45] Date of Patent: Dec. 1, 1992

[54] SNOWMAKING APPARATUS AND METHODS

[75] Inventors: James B. VanderKelen; William C. Topham, both of Midland; Donald R. Koenig, Bay City; Joseph M. VanderKelen, Midland, all of Mich.

[73] Assignee: Snow Machines Incorporated, Midland, Mich.

[21] Appl. No.: 639,981

[22] Filed: Jan. 11, 1991

[51] Int. Cl.⁵ ............................................. F25C 3/04
[52] U.S. Cl. .................................... 239/2.2; 239/14.2
[58] Field of Search ................... 239/2.2, 14.2, 77, 78

[56] References Cited

U.S. PATENT DOCUMENTS

| | | | |
|---|---|---|---|
| 4,004,732 | 1/1977 | Hanson | 239/2.2 |
| 4,083,492 | 4/1978 | Dewey | 239/2.2 |
| 4,214,700 | 7/1980 | Vanderkelen et al. | 239/2.2 |
| 4,222,519 | 9/1980 | Kircher et al. | 239/14.2 |
| 4,493,457 | 1/1985 | Dilworth et al. | 239/2.2 |
| 4,597,524 | 7/1986 | Albertsson | 239/14.2 |
| 4,682,729 | 7/1987 | Doman et al. | 239/2.2 |
| 4,813,598 | 3/1989 | Kosik, Sr. et al. | 239/2.2 |
| 4,836,446 | 6/1989 | Chanel | 239/2.2 |

*Primary Examiner*—Andres Kashnikow
*Assistant Examiner*—Christopher G. Trainor
*Attorney, Agent, or Firm*—Learman & McCulloch

[57] ABSTRACT

An improved ducted-fan type snowmaking machine and method wherein an impeller is driven at a variable speed selected to produce a variable noise level depending on the proximity of the apparatus to an inhabited area. The machine includes air stream straightening vanes for converting a spiraling stream to a linear, laminar flow stream, and a plurality of neucleating nozzles positioned within the confines of the duct.

16 Claims, 3 Drawing Sheets

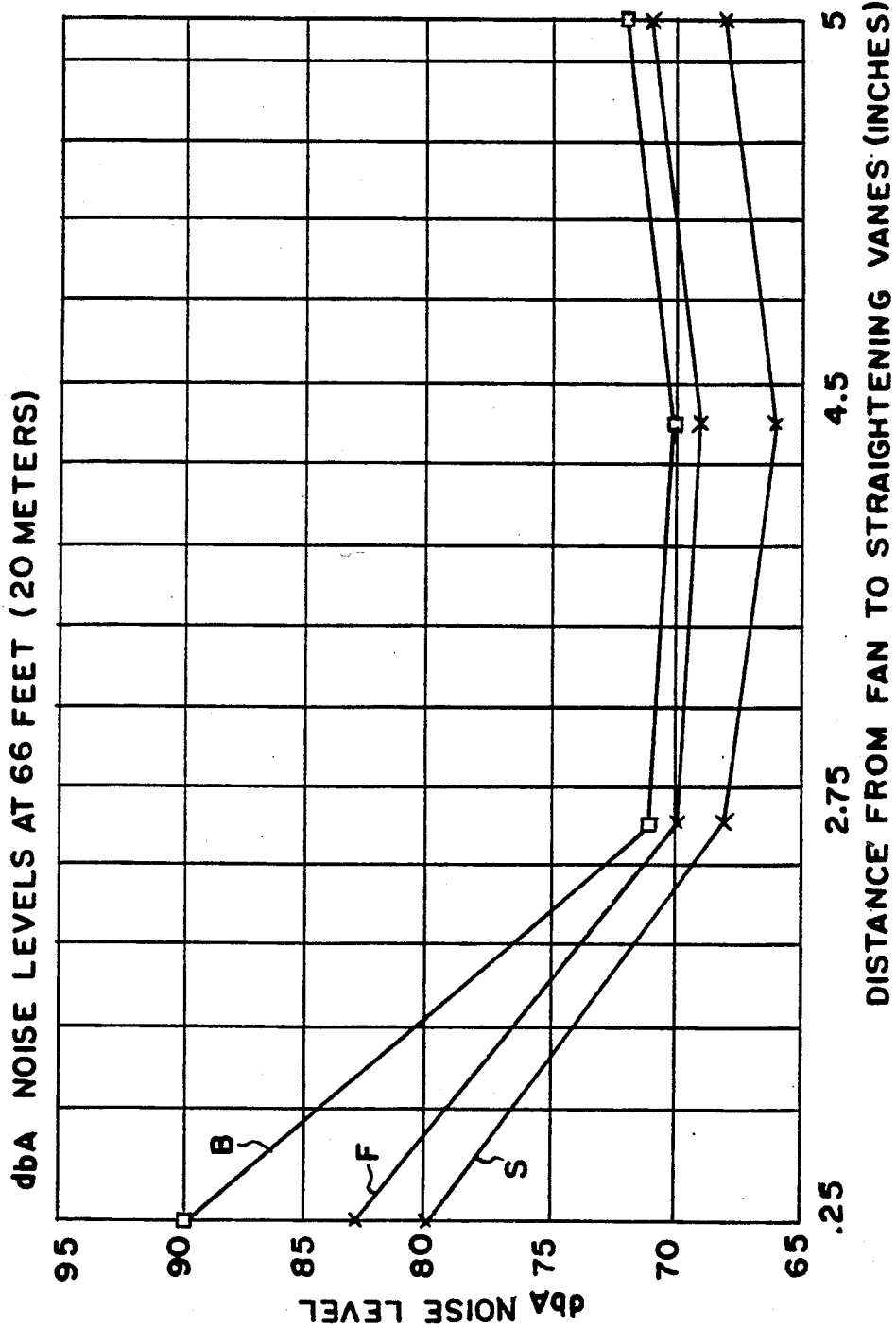

SNOWMAKING APPARATUS AND METHODS

FIELD OF THE INVENTION

The present invention relates to apparatus and methods for producing snow and more particularly to ducted-fan type snow making apparatus and methods wherein the level of noise attributable to the operation of such apparatus is controllable to adjust such level to one which is acceptable in relation to an inhabited area.

BACKGROUND OF THE INVENTION

Snowmaking machines of the ducted-fan type are well known and described in such patents as U.S. Pat. Nos. 4,004,732; 4,214,700; 4,222,519; and 4,493,457. In general, ducted-fan snowmaking machines include an axially-elongated duct or cowling supported on a portable carriage to permit movement of the machine to various locations. An impeller is rotatably mounted in the duct and rotated in a direction and at a speed to generate a substantially unidirectional air stream at atmospheric pressure for discharge from one end of the duct. Into the air stream is introduced a quantity of water by means of nozzles positioned about at least a portion of the discharge end of the duct. A nucleating or seeding nozzle is also located at the discharge end of the duct for introducing a mixture of water and compressed air into the stream to facilitate nucleation of snow crystals in the stream.

Ducted-fan type snowmaking machines provide numerous advantages over compressed air type snowmaking machines which had been used previously. In particular, ducted-fan type snowmaking machines provide a lower operating cost and have a lower noise level of operation than the compressed air type machines. The lower noise level exhibited by the ducted-fan snowmaking machines is a highly desirable feature since snowmaking machines often are used in proximity to inhabited areas, such as condominiums, hotels, and the like, where noise levels should be maintained as low as possible to avoid disturbing the inhabitants, especially during nighttime hours when they are attempting to relax or sleep.

For purposes of illustration, noise levels of various commercially available ducted-fan snowmaking machines (at distances of 20 feet and 66 feet in front of the machine discharge end) have been found to be in the range of approximately 71 to 84 dbA and 70 to 78 dbA (logarithmic scale decibel average), respectively. In contrast, noise levels of various commercially available compressed air machines have been found to be in the range of approximately 100 to 106 dbA and 91 to 94 dbA, respectively, at the same distances (20 feet and 66 feet) in front of the discharge end. As is apparent, the ducted-fan snowmaking machines offer substantially reduced noise levels of operation as compared to the compressed air machines. Even so, operators of ski and other facilities using snowmaking equipment on a frequent basis, especially near inhabited areas, continue to express a strong desire for snowmaking apparatus having still lower levels of noise.

It is an object of the present invention to satisfy this desire by providing improved ducted-fan snowmaking apparatus and methods wherein a particular noise level of operation can be purposefully and controllably selected with reference to the proximity of the apparatus to an inhabited area and provide environmentally acceptable noise levels.

SUMMARY OF THE INVENTION

The present invention comprises snowmaking methods and apparatus for ducted-fan type snowmaking machinery to permit purposeful and controllable selection of the noise level of the snowmaking operation with reference to the proximity of the machinery to an inhabited area. In particular, the snowmaking apparatus includes a rotary impeller for generating an air stream and variable speed drive means for varying the speed at which the impeller is driven to provide a preselected noise level of operation that is suited for the location of the snowmaking operation relative to an inhabited area. For example, the impeller drive means can comprise an electric motor for driving the impeller at a relatively high speed remote from an inhabited area to produce a relatively large amount of snow over a given time period at an attendant elevated noise level, and at a relatively low speed proximate the inhabited area to produce a smaller quantity of snow over the same period, but at a substantially reduced noise level of operation.

Detailed analyses of ducted-fan snowmaking machinery have revealed other sources of substantial noise. For example, the known machinery uses a single nucleating nozzle through which compressed air and water are discharged, and such nozzle conventionally is external of the duct at the discharge end thereof. Significant noise reduction has been achieved by providing multiple neucleating nozzles and positioning them within the confines of the duct at the discharge end thereof.

Analyses also have shown that ducted-fan machinery utilizing air stream straightening vanes produce appreciable noise due to the proximity of the vanes to the leading edges of the fan blades. Noise of this kind can be appreciably reduced by providing more space between the vanes and the fan blades.

The present invention is based on the apparently first-time recognition that unexpectedly large and predictable reductions in noise levels of the snowmaking operation are achievable using lower impeller speeds, multiple neucleating nozzles located within the confines of the duct, and optimum spacing between the impeller blades and the air stream straightening vanes, or any combination of such features. For example, selection of a relatively lower speed has been found to produce, in ducted-fan type snowmaking apparatus, a percentage reduction in noise level that typically is between six to twelve times greater than the corresponding percentage reduction in impeller speed. Further, adjusting the spacing between the vanes and the fan blades, locating the neucleating nozzle within the duct, and proliferating the number of neucleating nozzles cooperate to produce as much as a 30% additional reduction in the noise level.

To optimize the snowmaking operation, the invention also contemplates varying the amount of water introduced to the air stream in an amount proportional to the change in speed of the impeller to maintain proper air/water/seeding parameters for snowmaking.

The present invention thus provides improved ducted-fan type snowmaking apparatus and methods wherein a particular noise level of operation can be purposefully and controllably selected with reference to the site of which the apparatus is used so as to provide environmentally acceptable noise levels as well as flexibility in the time and location of snowmaking, while maintaining proper air/water/seeding conditions for making snow of acceptable quantities and quality.

DESCRIPTION OF THE DRAWINGS

FIG. 4 is a graph showing variations in noise levels at various spacings between the fan blades and the air stream straightening vanes.

DETAILED DESCRIPTION OF THE INVENTION

Figure 1:
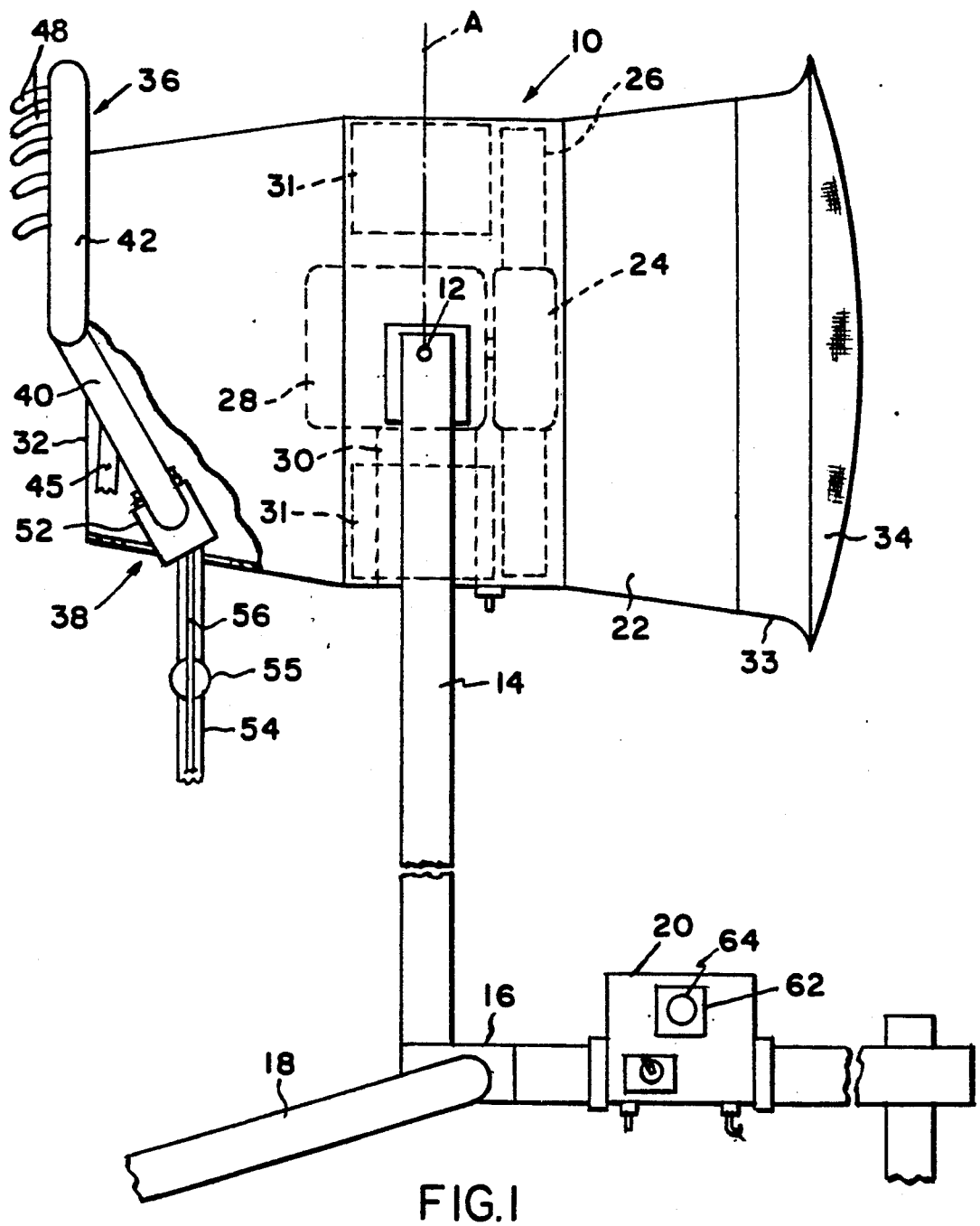
FIG. 1 is a side elevation, partly in section, of an exemplary ducted-fan type snowmaking apparatus for practicing the invention.
Figure 2:
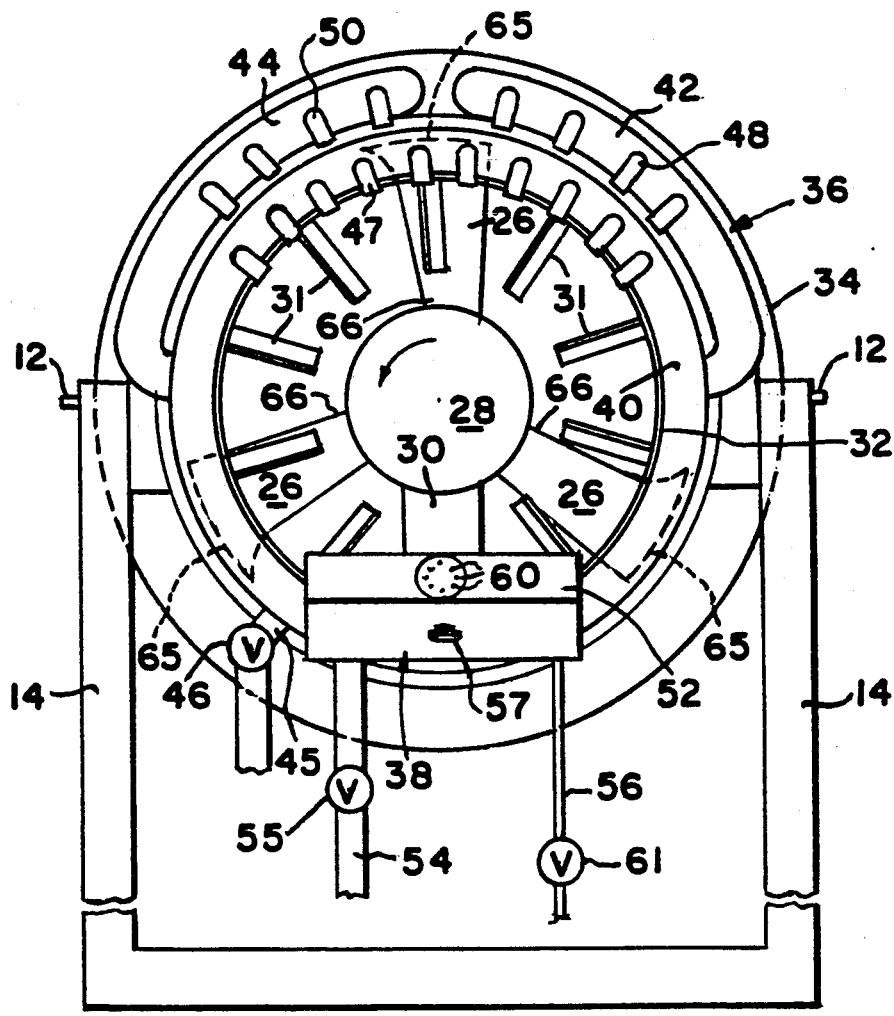
FIG. 2 is an elevation as viewed from the discharge end of the snowmaking apparatus.

FIGS. 1 and 2 illustrate a ducted-fan type snowmaking machine as described in detail in the VanderKelen and Riskey U.S. Pat. No. 4,214,700 and the Kircher et al U.S. Pat. No. 4,105,161, the disclosures of both of which are incorporated herein by reference. In general, the snowmaking machine includes an axial flow, ducted fan assembly 10 pivotally mounted by pins 12 on a yoke 14. The yoke 14 is rotatably mounted by a support tube 16 on a tripod or other base or carriage 18 (schematically depicted in FIG. 1) of the type shown in the aforementioned patents. The yoke 14 is rotatable relative to the base 18 about a vertical axis A through a 360 degree range. An electrical control box 20 is mounted on the base 18 and includes suitable switches and the like for operating the assembly 10 in accordance with the invention as explained below.

The fan assembly 10 comprises an axially elongated duct or cowling 22 having a rotatable impeller 24 with a complement of circumferentially spaced, radially projecting blades 26 mounted thereon. In accordance with the invention, the impeller 24 is driven in one direction of rotation (counterclockwise as viewed in FIG. 2) by a variable speed drive motor 28 and control means (to be described in detail below), the motor being mounted coaxially in the duct 22 by a suitable support 30 fixed in the duct 22 in such position that the axis of rotation of the impeller coincides with the longitudinal axis of the duct.

A plurality of circumferentially spaced, longitudinally and laterally curved vanes 31 are fixed on and equally distributed about the inner surface of the duct 22 and forwardly of the fan blades 26 for the purpose of converting the generally spiral air flow generated by rotation of the impeller 24 to a substantially linear, unidirectional air stream for discharge from the front or discharge end 32 of the duct 22. The duct 22 includes an air intake or rear end 33 covered by a screen 34 through which outside air is drawn by the impeller 24.

Water spray means 36 and nucleating or seeding means 38 are positioned at the discharge end 32 of the duct 22 above and below the discharged air stream as is conventional, except as explained below. In general terms the water spray means 36 comprises arcuate water manifolds 40, 42, and 44 in communication with a supply of water via a pipe 45 and a valve 46. An arcuate array of adjustable water nozzles 47, 48, and 50 on the respective manifolds enables the water to be discharged in spray form into the air stream.

The nucleating means 38 comprises a reservoir 52 having a water inlet 54 in communication with a source of water via a valve 55, and a compressed air inlet 56 in communication with a source of compressed air. Within the reservoir is a known mixing valve (not shown) and a valve operator 57 carried by the reservoir. In communication with the outlet of the mixing valve is a plurality of neucleating nozzles 60 arranged in a circle and directed upwardly and forwardly of the duct. The nozzles 60 are arranged to direct a mixture of water and compressed air upwardly into the air stream to facilitate formation (seeding) of snow crystals. The water spray components shown in FIGS. 1 and 2 are described in more detail in U.S. Pat. No. 4,213,700, although the invention is not intended to be limited to those particular components.

The neucleating means 38 differ from existing neucleating devices in two significant aspects. First, the neucleating means 38 employs a plurality of nozzles, rather than one. Second, the neucleating nozzles are mounted in such manner that they are within the confines of the duct 22 rather than external thereof. Both of these differences result in significant reductions in noise levels.

As mentioned above the impeller 24 is driven by a variable speed motor 28. The motor may comprise an electrical or hydraulic motor whose speed is variable, typically over a selected range (such as 900-2200 rpm), to provide, for the particular size duct used, an air stream of a volume and velocity suitable for the making of acceptable quantities of snow. Any one of a number of commercially available, variable speed electric motors may be used and equipped with a known speed control or rheostat 62 having an adjustable knob 64. Alternatively, a known variable frequency device may be used to vary the speed of the motor. The speed control device is incorporated in the electrical control box 20 as shown schematically in FIG. 1 for convenient access to the operator of the snowmaking apparatus.

Another significant distinction between apparatus constructed in accordance with the invention and known apparatus is that the impeller blades 26 are spaced axially rearwardly or upstream from the vanes 31 by a distance sufficient to produce a substantial reduction in noise resulting from the rotation of the blades past the vanes. This characteristic of the invention will be explained in more detail shortly.

The invention may be manufactured as original equipment snowmaking apparatus. However, it also may be retrofitted to existing snowmaking apparatus.

In accordance with the invention, the speed of the drive motor 28, and thus the impeller 24, is adjustable to provide a preselected noise level during the snowmaking operation that is suited to the proximity of the snowmaking apparatus to an area inhabited by people or wildlife. For example, the impeller speed typically is selected at a first, relatively high level, such as 1750 rpm, when the apparatus is at a remote location from the inhabited area to produce a relatively large amount of snow over a given time period with an attendant elevated noise level of operation. On the other hand, the impeller speed may be adjusted to a lower level, such as 1200 rpm, if the apparatus is located closer to the inhabited area. Lowering of the impeller speed may result in the production of a smaller amount of snow over the same time period, but the noise level resulting from the lower impeller speed will be appreciably reduced compared to the noise level resulting from the higher impeller speed.

Noise level control by means of the invention is illustrated in the following Table which includes data using commercially available Axipal and Joy fans of the diameters indicated and operated at two different speeds, for example 1750 rpm and 1200 rpm, representing impeller speeds that would be employed at locations remote and proximate, respectively, to an inhabited area. In the Table, the noise level was measured in terms of logarithmic scale decibel average (dbA) wherein an increase or decrease of 3 dbA represents a doubling or halving of the apparent level of noise of the snowmaking operation. The front and back measurements were taken directly from in front and back of the apparatus whereas the right (RT) and left (LT) side measurements were taken at 90° to the apparatus.

TABLE

| NOISE DATA in dbA (BACKGROUND NOISE 50-53 dbA) | | | | | | | | | |
|---|---|---|---|---|---|---|---|---|---|
| Distance from | | FRONT | | RT SIDE | | LT SIDE | | BACK | |
| fan (feet) | RPM | 20' | 66' | 20' | 66' | 20' | 66' | 20' | 66' |
| Fan 1 | 1750 | 81 | 70 | 74 | 65 | 74.5 | 65 | 82 | 70 |
| (Axipal- | 1200 | 74.5 | 64 | 65 | 57 | 67.5 | 57 | 74 | 63 |
| 31¼" dia.) | | | | | | | | | |
| Fan 2 | 1750 | 79.5 | 68.5 | 75 | 65 | 80 | 65 | 81 | 69 |
| (Joy-36" Dia.) | 1200 | 70 | 60 | 65 | 58 | 68 | 54 | 70.5 | 60 |

From data listed in the Table, it is apparent that impeller speed reduction from 1750 rpm to 1200 rpm (a 33% speed reduction) resulted in a reduction in the noise level of the snowmaking operation by a factor of about 2 to 4 (200-400% reduction). This translates to a percentage reduction in noise level that is about 6 to 12 times greater than the corresponding percentage reduction in the impeller speed.

The tremendous reduction in the noise level of the snowmaking operation in response to the relatively small (33%) impeller speed reduction was quite unexpected and provides for the first time the capability of selecting a particular noise level of operation that can be purposefully controlled and selected with reference to the location (i.e., remote or proximate) of the apparatus to an inhabited area so as to provide environmentally acceptable noise levels as well as flexibility in the time and location of snowmaking. For example, operation of the snowmaking apparatus of the invention at the lower impeller speed permits snow to be made in proximity to an inhabited area, such as a condominium, hotel and the like, during both day and nighttime hours with much less disturbance of the inhabitants. Alternatively, the snowmaking apparatus can be operated at the higher impeller speed at a location remote from the inhabited area to produce a greater amount of snow over a given time period at a higher noise level. However, since the apparatus is located remote from the inhabited area, the higher noise level will not be objectionable.

In accordance with another aspect of the invention, the amount of water directed into the air stream discharged from the duct 22 may be varied in response to variations in the impeller speed to maintain proper conditions for snowmaking. For example, as the impeller speed is reduced or increased, the amount of water introduced into the air stream by the water spray means 36 and the amount of water and compressed air introduced by the nucleating means 38 may have to be correspondingly or proportionately reduced or increased, depending on such variable factors as ambient temperature and humidity. Accordingly, apparatus constructed and operated in accordance with the invention includes the valve 55 in the water supply line to the reservoir 53 and another valve 61 in the compressed air line 56. These valves may be used in conjunction with the valve 46 to control not only the water flow rate to the manifolds 40, 42, and 44 but also to the seeding nozzles 60 in response to variations in the speed of the impeller so as to maintain proper air/water/seeding conditions for snowmaking.

The use of multiple seeding nozzles 60, rather than one, coupled with locating the nozzles within the confines of the duct, reduces substantially the noise level produced by the discharge of the mixed water and compressed air, particularly the noise at the sides of the duct. For example, noise levels at the left side of the duct were reduced in one test from 93 dbA at 20 feet to 80 dbA, and at 66 feet from 81 dbA to 68 dbA. Similar decreases were measured at the right side of the duct at corresponding distances. The noise levels referred to are those resulting from a comparison of a prior art machine in which a single neucleating nozzle is external of the duct and the same kind of machine wherein there is a plurality of such nozzles located within the confines of the duct as described herein.

Figure 3:
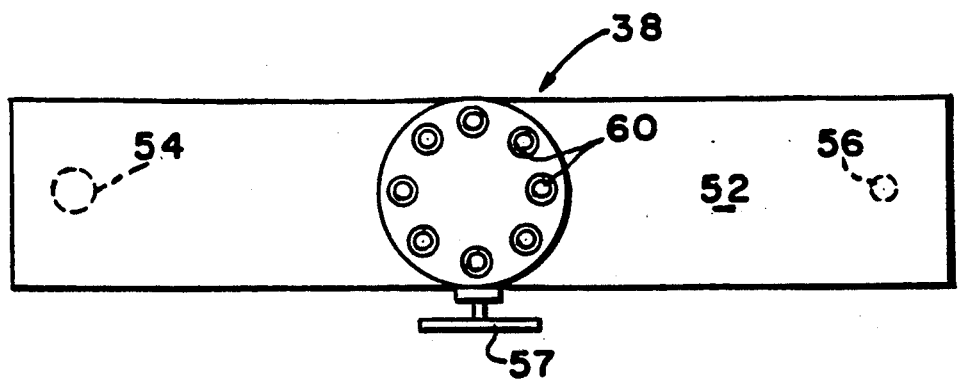
FIG. 3 is an enlarged plan view of the neucleating apparatus.

As shown in FIGS. 2 and 3, eight circumferentially spaced neucleating nozzles 60 are provided. However, more or less may be used if desired. Further, the array of nozzles may be encircled by a ring or collar if desired. It is preferable to concentrate the nozzles in a grouping below the longitudinal axis of the duct so as to obtain as much as possible a uniform flow of compressed air and water through each nozzle.

Air flow straightening vanes like the vanes 31 have been used heretofore to convert the spiraling air stream produced by rotation of the fan blades to a linear, laminer flow stream. It has been the custom to locate the rear edges of the vanes quite close to the leading edges of the blades to provide what was believed to be the most efficient conversion of the flow of the air stream. It has been discovered, however, that the spacing between the rear edges of the vanes and the leading edges of the blades has a significant influence on the level of noise generated by operation of the impeller.

The effect on the noise level attributable to the spacing between the rear edges of the vanes 31 and the leading edges of the impeller blades is that a spacing of between about 2 and 5 inches results in a noise level reduction of several dbA. Test data relating to different spacing between the vanes and the impeller blades are shown in FIG. 4. Curve B indicates the noise levels present at a distance of 66 feet directly behind the machine; curve F indicates the noise levels at a distance of 66 feet directly in front of the machine; and curve S indicates the noise levels at a distance of 66 feet from and at right angles to one side of the machine. The data show the noise levels at the several positions produced when the leading edges of the fan blades are spaced 0.25, 2.75, 4.5, and 5.0 inches, respectively, from the rear edges of the vanes 31.

The data shown in FIG. 4 were produced by an impeller having blades like those shown in FIG. 2 wherein the tip 65 of each blade has appreciably greater circumferential length than that of the root 66. The blades shown in FIG. 2 are conventional in Axipal fans.

From the foregoing it will be apparent that conventional ducted-fan snowmaking machinery may be modified in any one or more of four different ways to control the level of noise generated by operation of such machinery. First, the speed of rotation of the impeller may be varied; second, the conventional single neucleating nozzle may be replaced by a plurality of nozzles; third, the nucleating nozzles may be located within the confines of the duct; and fourth, the space between the rear ends of the air stream straightening vanes and the leading edges of the impeller fan blades may be adjusted to be between about 2 and 5 inches.

This disclosure is representative of preferred embodiments of the invention and is intended to be illustrative rather than definitive thereof. The invention is defined in the claims.

We claim:

1. In snowmaking apparatus having a duct within which is a rotatable impeller for generating an air stream for discharge from the duct, and means for introducing water into the air stream in such quantity as to produce snow, the improvement comprising variable speed drive means for driving said impeller at variable speeds selected to produce predetermined relatively high and low noise levels; and means for varying the amount of water introduced into the air stream commensurately with the variation in the speed of said impeller.

2. The apparatus of claim 1 wherein the speed of said drive means is adjustable to such extent that said relatively high noise level is not less than six times greater than that of said relatively low noise level.

3. The apparatus of claim 2 wherein the percentage reduction between said relatively high and relatively low noise levels is between six and twelve times greater than the corresponding percentage reduction in the speed of said impeller.

4. The apparatus of claim 1 wherein said impeller has blades and said duct has air stream straightening vanes downstream from said impeller blades, said vanes being spaced between about 2 and 5 inches downstream from said blades.

5. The apparatus of claim 4 wherein each of said blades has a tip and a root, said tip having a greater circumferential length than that of said root.

6. The apparatus of claim 1 including nozzle means for introducing nucleating air and water into said air stream, said nozzle means being located within the confines of said duct.

7. The apparatus of claim 1 including nozzle means for introducing nucleating air and water into said air stream, said nozzle means comprising a plurality of nozzles located within the confines of said duct.

8. The apparatus of claim 7 wherein said nozzles are arranged in circular form.

9. In a method of making snow wherein an impeller is rotated in a duct to generate an air stream for discharge from the duct and wherein water is introduced into the air stream in such quantity as to produce snow, the improvement comprising varying the speed of rotation of the impeller to produce relatively higher and relatively lower predetermined noise levels; and varying the amount of water introduced into the air stream commensurately with the variation in speed of rotation of said impeller.

10. The method of claim 9 including varying the speed of rotation of said impeller to such extent as to produce a percentage variation between the relatively higher and lower noise levels of about six times greater than the corresponding percentage variation in the speed of rotation of said impeller.

11. The method of claim 9 including varying the speed of rotation of said impeller to such extent as to produce a percentage variation between the relatively higher and lower noise levels of between six and twelve times greater than the corresponding percentage variation in the speed of rotation of said impeller.

12. The method of claim 9 including introducing a nucleating mixture of water and air into said air stream.

13. The method of claim 12 including introducing the nucleating mixture into said air stream from a position within the confines of said duct.

14. The method of claim 13 wherein the nucleating mixture is sprayed into said air stream via at least one nozzle.

15. The method of claim 13 wherein the nucleating mixture is sprayed into said air stream via a plurality of nozzles.

16. The method of claim 15 including encircling said plurality of nozzles by an annulus.

* * * * *